United States Patent [19]

Hognestad et al.

[11] Patent Number: 5,054,992
[45] Date of Patent: Oct. 8, 1991

[54] METHOD OF TRANSPORTING THIN, PLANAR PRODUCTS, AND A LOAD CARRIER FOR SUCH TRANSPORT

[75] Inventors: Jon Hognestad; Einar K. Selvig, both of Kongsberg, Norway

[73] Assignee: Media Craft a.s., Kongsberg, Norway

[21] Appl. No.: 372,965

[22] Filed: Jun. 29, 1989

[30] Foreign Application Priority Data

Jul. 8, 1988 [NO] Norway .................................. 883061

[51] Int. Cl.⁵ ............................................. B65G 35/00
[52] U.S. Cl. ............................ 414/786; 198/803.01; 414/417
[58] Field of Search ............... 414/786, 417, 416, 418, 414/413, 929; 198/803.01, 803.2, 465.1, 465.2, 465.3

[56] References Cited

U.S. PATENT DOCUMENTS

| | | | |
|---|---|---|---|
| 3,108,679 | 10/1963 | Woody | 414/417 X |
| 3,310,187 | 3/1967 | Barker et al. | 414/418 X |
| 3,858,746 | 1/1975 | Hirota | 414/417 X |
| 4,069,931 | 1/1978 | Saylors | 414/417 |
| 4,273,496 | 6/1981 | Papalexis | 414/417 |
| 4,543,035 | 9/1985 | Lair | 414/417 X |
| 4,571,141 | 2/1986 | Gieson | 414/417 |
| 4,636,129 | 1/1987 | Lanham, Jr. | 414/417 |

Primary Examiner—David A. Bucci
Attorney, Agent, or Firm—Sughrue, Mion, Zinn, Macpeak & Seas

[57] ABSTRACT

A method of transporting stacks of thin, planar products, such as periodicals, books, newspapers or the like, and a load carrier for such transport. The load carrier comprises a bottom (5) and four sides (1-4), and at least one pair of the mutually opposite sides (1, 3 resp. 2, 4) is provided with one or more upwards open slots (b 6, 7 resp. 8, 9 and 10, 11), whereas the bottom (5) is provided with a corresponding opening pattern in the form of upwards open channels (22, 23) which are open towards the slots. The load carrier is transported on a chain conveyor, and the product stack (18) placed on the carrier possibly is strapped while resting on the carrier, and the carrier is separated from the stack (18) by introducing a supporting device in the bottom channels (22 or 23) of the carrier beneath the stack, whereafter the stack is separated from the carrier by relative movement therebetween.

3 Claims, 2 Drawing Sheets

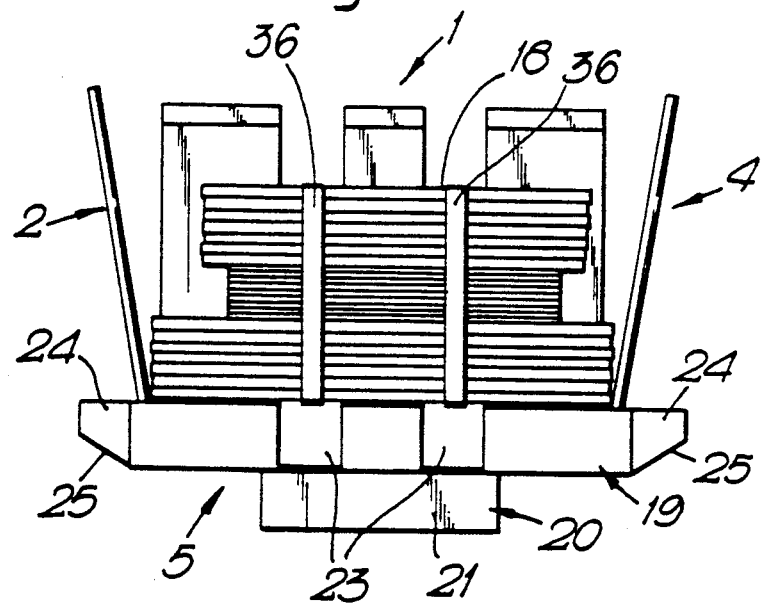
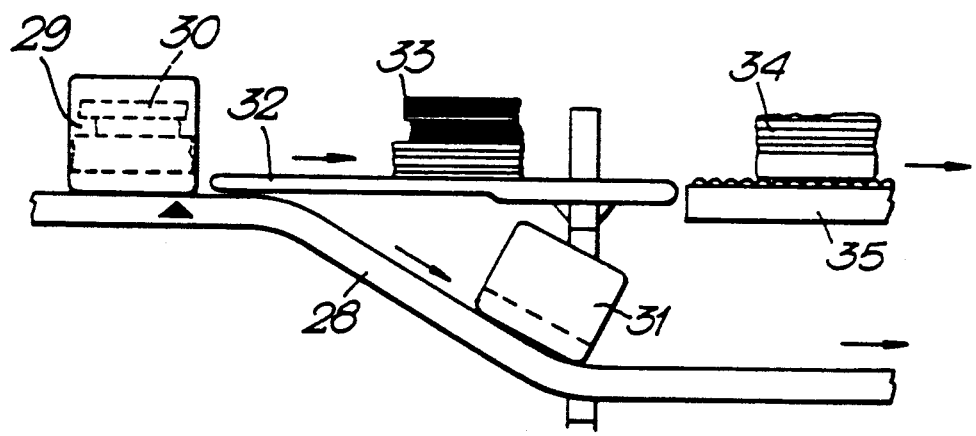

METHOD OF TRANSPORTING THIN, PLANAR PRODUCTS, AND A LOAD CARRIER FOR SUCH TRANSPORT

The present invention relates to a method of transporting a plurality of essentially thin, planar products, such as periodicals, books, newspapers or the like, wherein the products are placed in a stack on a load carrier transported on a transport path. The invention also relates to a load carrier for such transport, and comprising an essentially rectangular bottom and four sides.

A method and a load carrier of the above-mentioned type may be used for example in printing offices, in the transport of stacks of printed products, i.e. books, periodicals, newspapers, advertising material and the like, on a transport path from a stacking machine forwards to a palletizing machine, in packing rooms and in distribution centers wherein printed goods are co-packed for dispatch to subscribers, retailers and regional centers.

Another topical field of use is in distribution centers for playing coupons, audio and video cassettes and similar small packages.

When constructing and moving stacks or piles of e.g. different newspapers and periodicals, it is of importance to insure a stable form and prevent sliding. In the above-mentioned fields of application this has necessitated a substantial amount of manual effort, both in the formation of piles and during the transport stage, in order to take care of problems with piles sliding during free transport. The known systems in this topical field are limited with respect to automation, flexibility and rapid and safe product handling, and they also require much space having transport paths based on roller, wheel or belt conveyors.

Thus, it is an object of the invention to provide a method resulting in a transport plant which is substantially cheaper, less space-demanding, safer and more suitable for automation than the previously known systems used in printing offices or packing rooms today.

The above-mentioned object is achieved with a method of the introductorily stated type which, according to the invention, is characterized in that the load carrier is transported on a continuous chain conveyor, that the product stack optionally is strapped while resting on the carrier, the carrier having walls with essentially vertically extending slots and a bottom with a corresponding opening pattern to permit the placing of straps around the stack, and that the carrier is separated from the stack by introducing a supporting means into the bottom openings of the carrier, whereafter the stack is separated from the carrier by relative movement therebetween.

Another object of the invention is to provide a load carrier of the introductorily stated type which, by its design, provides for securing the transport of the product types in question, and which is especially advantageous in processes wherein the packaging and/or transport of the products is presupposed to take place automatically.

According to the invention, this object is achieved in that at least one pair of mutually opposite sides of the load carrier is provided with one or more upwardly opening slots, and that the bottom is provided with a corresponding opening pattern in the form of through-going, upwardly opening channels which are open towards said slots.

The bottom of the load carrier preferably is provided with a bottom plate which is smaller than the principal dimensions of the carrier, and which is arranged for mounting on a chain conveyor. Thereby a substantial space saving is achieved since chain conveyors are substantially less space-demanding than the conventionally used roller, wheel and belt conveyors. The upwardly opening channels of the bottom of the load carrier form through-going cavities between the interior bottom of the carrier and the commodity content. By guiding these cavities towards a fork-shaped hoist means or several narrow, parallel conveyor belts, the content can be separated from the carrier in a simple manner, while both members are in motion and with the least possible disturbance of the content (the pile). The distance between the internal bottom and the content also gives a possibility for strapping of the content while located in the carrier. In this manner the pile is secured against sliding or disengagement, and another form of wrapping can be omitted.

By means of the stated method one achieves the substantial advantages that 1) the carrier and its content may be separated while the content retains its movement velocity and direction and the carrier is fed by a continuous chain conveyor, and that 2) the content of the carrier may be strapped while the content rests on the bottom of the carrier.

The carrier in addition meets a number of requirements associated with automated transport and co-packaging of the topical product categories. Such requirements are accurate positioning, identification and detection, queuing, alteration of speed of direction on the same conveyor and possibility of processing (e.g. shaking) of the content of the carrier while being in the carrier.

When using the carrier according to the invention in combination with a simple, profile-based chain conveyor, not only the above-mentioned objects are achieved, but in addition the speed of the path may be increased, there may be produced piles having more copies per laying (a laying is the number of periodicals arranged with the back side directed the same way from a stacking machine), and the size of the piles may be increased and thereby also the total speed of production.

The invention will be further described below in connection with an exemplary embodiment with reference to the accompanying drawings, wherein FIG. 1 shows a schematic perspective view of a load carrier according to the invention;

FIG. 3 shows a sectional side view of the load carrier, taken at right angles to the section in FIG. 2; and FIG. 4 shows a cut of a conveyor with load carriers according to the invention.

Figure 1:
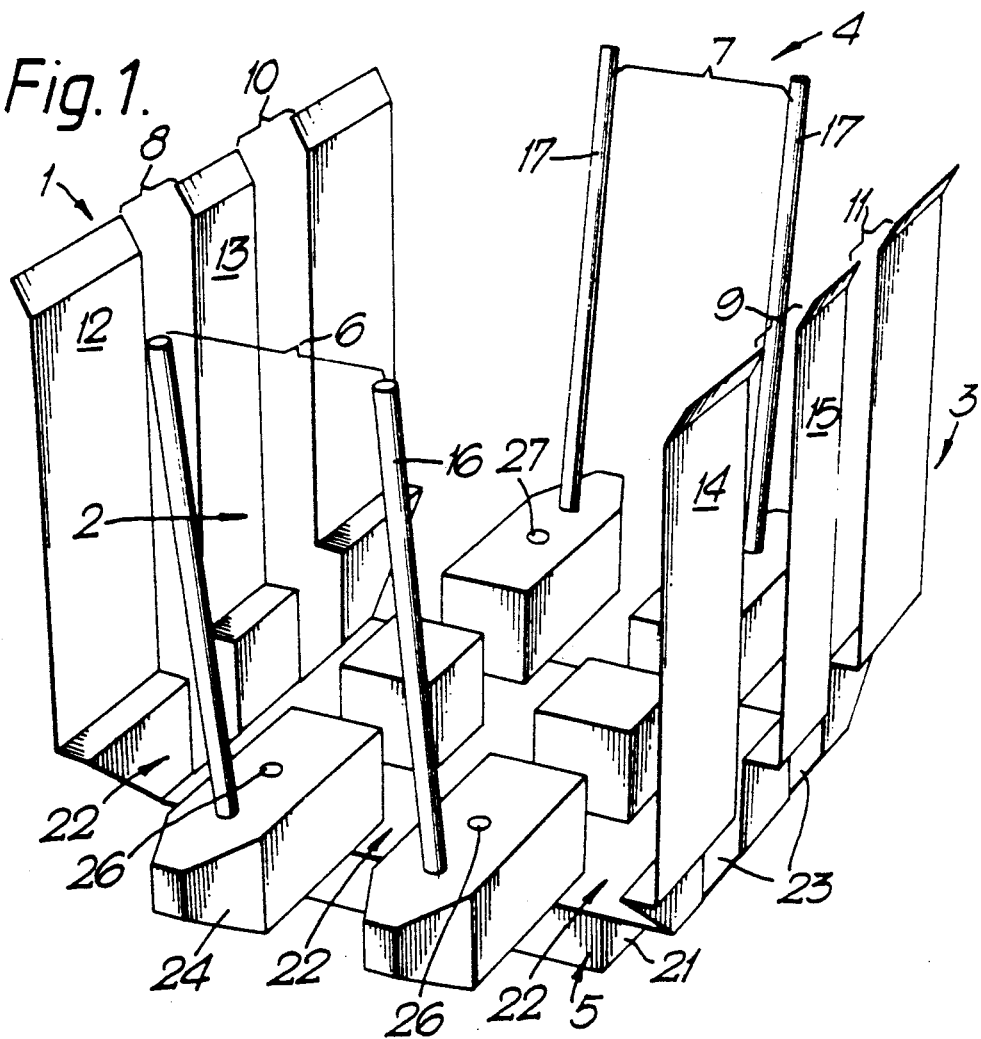

As shown in FIG. 1, the load carrier according to the invention is a basket-like device having four sides 1, 2, 3 and 4 and an essentially rectangular bottom 5.

Figure 2:
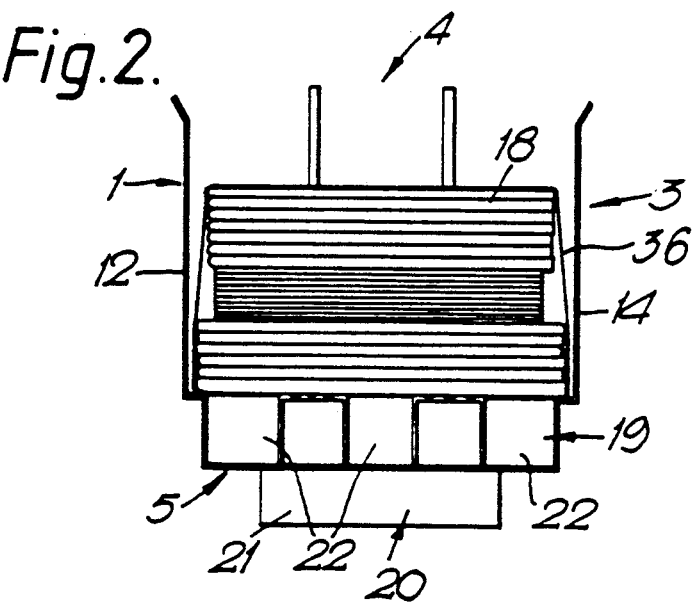
FIG. 2 shows a sectional side view of the load carrier with content.

At least one pair 1, 3 or 2, 4 of the mutually opposite sides is provided with one or more upwardly opening openings or slots which are aligned with each other on the opposite sides, for example the slots 6, 7 in the sides 2, 4 and the slots 8, 9 and 10, 11 in the sides 1 and 3. The sides may be formed by plate-shaped elements defining in pairs an intermediate slot, like the elements 12, 13 of the side 1 and the elements 14, 15 of the side 3. As an alternative, the sides may be constituted by two or more sticks or rods, such as the sticks 16 and 17 in FIG. 1, the sticks being inserted in suitable holes in the bottom member. The sides on the short and/or long sides may be at least partly diverging, i.e. slightly inclined outwards throughout or along parts of their length, for example as shown for the sticks 16 and 17. Thus, one achieves a simpler separation of the carrier and its content, and it may be simpler to supply a load to the carrier. In FIGS. 2 and 3 such a load is shown in the form of a stack 18 of thin, planar products of different dimensions, e.g. a stack of different newspapers or periodicals (magazines). As shown, the stack 18 is strapped by a pair of straps 36. The strapping operation may be performed while the stack is located in the carrier, as further described below.

The bottom 5 of the carrier consists of an inner and an outer bottom portion 19 and 20, respectively. The outer bottom portion is constituted by a rectangular, preferably square bottom plate 21 which, as shown, is smaller than the principal dimensions of the carrier and is adapted for mounting on a chain conveyor, with the load carrier oriented either longitudinally or transversely of the conveyor path. The bottom plate possibly may be formed with positioning recesses, identification discs or codes (not illustrated).

The inner bottom portion 19 of the carrier is formed with a plurality of upwardly opening channels 22 and 23, respectively, extending longitudinally and transversely of the bottom and forming an opening pattern corresponding to or cooperating with the vertical slots in the walls 1–4 of the carrier. The channels thus open into the appurtenant slots, while the channels 22 which on one side are defined by the side walls 1 and 3, in addition have lateral openings passing into the appurtenant slots and being aligned with respective ones of the crossing channels 23. The inner or internal bottom portion thus has raised supporting points between the channels which in turn form upwardly and laterally open cavities between the content (the load) of the carrier and its internal bottom. These cavities render it possible to introduce an object underneath the content of the carrier from the side.

It will be appreciated that, in the present context, the terms "slot" and "channel" should be interpreted in a wide sense. Thus, the term "slot" is intended to cover all kinds of wall openings extending throughout the wall height, and the term "channel" is intended to cover all kinds of upwardly opening bottom recesses interconnecting wall slots belonging together in a functional sense.

The built-up bottom between the longitudinally extending channels 22 has, as shown, laterally projecting elements 24 which, at least on the underside, are provided with a bevel or chamfer 25. The chamfer is formed by the projecting portions being cut along a sloping line from the bottom plate 21 to the projecting elements. Such chamfers may also be provided both in the longitudinal direction and in the transverse direction. Thus, transport is facilitated in curves of the transport path having a relatively small radius of curvature.

Out of operational or manufacturing considerations, all of the elements in the bottom and side structure may be rounded at their corners.

The carrier may be constructed so that the mutual distances of the walls are adjustable, in order to be able to adjust the size of the carrier, for example by having sides which can be pushed towards or away from each other (not shown), or by having holes 26, 27 of varying mutual distance, as shown in FIG. 1, for suitable placing of the side wall sticks 16 and 17.

The carrier may be formed from any suitable material, e.g. moulded plastics or metal. In an advantageous embodiment, the carrier comprises a bottom member consisting of a one-piece plastic or metal casting, and side walls constituted by a number of upstanding sticks placed in suitable holes in the bottom member.

Various possible working operations in connection with the carrier will be described below with reference to FIG. 4.

FIG. 4 is a sectional view of a driven chain conveyor 28 on which there is shown a load carrier or basket device 29 having a commodity content in the form of a stack 30, and an empty basket device 31 on a return basket path.

The commodities which are to be transported, are dropped into the load carrier (in the following called basket) from a stacking machine, or from other automatic picking and counting machines, or by manual effort. The basket may also be filled by moving it vertically or obliquely upwards towards a stack or pile being at rest or moving with an adjusted speed.

Strapped piles may be unstrapped after having been placed in the basket, by gripping the strap manually or mechanically, cutting the strap and pulling it away from the basket. Piles which are covered with plastic, in a similar manner may be freed from the plastic while being located in the basket.

Further, stacks may be strapped while being situated in the basket. This is done by carrying one end of a strap underneath the content of the carrier and through one of the bottom channels, while the other end of the strap is taken over and around the stack, and the strap is tightened and the end portions tied or welded together. There may be used one or more straps, crosswise or parallel.

The basket is separated from its content by introducing a fork-shaped hoist means in the bottom channels of the basket, longitudinally or transversely of the basket, beneath the content of the basket. Thereafter the content is lifted out, or the basket is dropped, or the basket and the content are separated gradually during movement while the vertical mutual distance increases, for example when the basket follows a sloping portion of a return path, as shown in FIG. 4. In the latter case the fork means will consist of two or more narrow, parallel conveyor belts 32. In FIG. 4 there is also suggested, for example, that finished packages or bundles 33 and 34 are carried via the transport means 32 forwards to an additional transport means 35 on which the packages are carried further e.g. to a shrinkage tunnel for plastic wrapping.

We claim:

1. A method of transporting stacks of thin, planar products, such as periodicals, books, or newspaper, along a transport path, said method comprising the steps of:

providing a plurality of basket-like load carriers each having a bottom and four sides;

placing said products in stacks in respective ones of said basket-like load carriers, providing each load carrier with upstanding wall members defining vertically extending upwardly open slots in at least one pair of mutually opposed sides, and a bottom member having a corresponding opening pattern formed by through-going, upwardly opening channels which open towards and communicate with associated slots, transporting said load carriers on at least one conveyor means forming a continuous closed path and on which said load carriers are slidably retained to allow queuing at work stations along said continuous closed path, introducing a supporting means into bottom channels of a load carrier beneath a stack contained therein, and removing said stack from said load carrier by vertically separating relative movement between said supporting means and said load carrier.

2. A method according to claim 1, wherein said removing step comprises removing the stacks from the respective carriers by introducing a stationary supporting means comprising two or more narrow parallel conveyor belts extending in the transport direction into respective load carrier bottom channels, and thereafter vertically separating said load carrier from said supporting means by said load carrier continuing its movement along a sloping portion of the conveyor path, so that the stack is taken by said conveyor belts.

3. A method according to claim 1, wherein said removing step comprises removing the stacks from the respective load carriers by introducing a supporting means comprising a fork-shaped hoist means into carrier bottom channels extending transversely to the transport direction while said load carrier is held stationary at a removal station, the stack thereafter being lifted out of the carrier by moving the hoist means along associated vertical side slots of said load carrier.

* * * * *